Patented Nov. 21, 1950

2,530,493

UNITED STATES PATENT OFFICE 2,530,493

MAGNESIUM-CONTAINING INCENDIARY COMPOSITION AND PROCESS OF PRODUCING SAME

William F. Van Loenen, Laurel, Calif., assignor to Kaiser Aluminum & Chemical Corporation, a corporation of Delaware No Drawing. Application June 19, 1948, Serial No. 34,149

12 Claims. (Cl. 52—23)

The present invention relates to incendiary mixes, and more particularly to an incendiary composition including magnesium and a sticky additive as ingredients thereof and to a method of preparing the composition.

In my copending application Serial No. 492,989, filed July 1, 1943, now Patent No. 2,509,710 dated May 30, 1950, I have set forth the production of magnesium metal from magnesium oxide by carbothermic reduction according to the process disclosed in Patent No. 1,884,993 (Hansgirg). Therein a mixture of MgO and carbon is converted into magnesium vapor and carbon monoxide by the heat of an electric arc furnace. This gaseous mixture is discharged from the region of the arc at a high enough temperature (above 1800° C.) that reversal of the reaction occurs only upon cooling, and is then suddenly cooled and diluted by injecting large volumes of a shock chilling agent, which may be hydrogen, natural gas, hydrocarbon vapor or even a spray of liquid hydrocarbon.

In one particular practice of the process natural gas is employed. The magnesium vapor is condensed to magnesium metal in the form of extremely fine dust. Some of the vapor recombines with carbon monoxide with the result that the solid material, or magnesium bearing dust, precipitated in the condensing chamber comprises a substantial proportion from 30 to 65% of magnesium dust with the remaining 70 to 35% comprising carbon, magnesium oxide and other impurities. A typical sample of a normal run shows 47% by weight of magnesium metal dust.

This condensate, i. e., the magnesium dust with admixed impurities, while it requires coalescing of the magnesium dust to produce compact metal, is, nevertheless, highly pyrophoric, and will combust spontaneously when exposed to the atmosphere. To diminish this tendency so that the material may be safely handled for sublimation into crystalline magnesium metal, it is now customary to wet the precipitate with a light hydrocarbon oil having a flash point above 100° F., with or without the addition of asphalt to produce a relatively stiff plastic mass which is termed herein as carbothermic magnesium paste. The asphalt is added when it is desired to make the mass somewhat cohesive, particularly where it is desired to tablet the material into compact pellets or briquettes. Where the shock chilling is produced by oil spray, the shock chilling oil wets the precipitate and inhibits ignition while forming carbothermic magnesium paste.

Experiments proved that this carbothermic magnesium paste, i. e., magnesium dust and impurities wet with oil and with or without asphalt or other binder is not spontaneously reactive with dry air. However, water vapor or spray will ignite the carbothermic magnesium paste and this paste-water combination provides an inexpensive incendiary.

The average analysis of the magnesium dust is:

|  | Per cent |
|---|---|
| Magnesium | 50 |
| Carbon | 10 |
| Inert (principally MgO) | 31 |

A small percentage of the magnesium (approximately 5%) exists as one or both of the carbides —$MgC_2$ and $Mg_2C_3$. There is generally a trace of sodium which is believed to be in elemental form and possibly minor traces of other carbides such as calcium, silicon and aluminum originating from the ash constituents from the metallurgical coke in the reduction furnace and/or from the minor ash constituent in the petroleum coke used for reduction. With the exception of occasional carry over of particles from the reduction furnace all of these materials have an ultimate particle size below the resolving power of optical microscopes. Electron microphotographs reveal agglomerates several microns in diameter and ultimate particles in the neighborhood of 0.1 micron.

The hydrocarbons which may be employed for wetting the magnesium dust may advantageously consist of 50% distillate and 50% asphalt, which is a well-distilled residue of an uncracked asphalt base oil. A typical analysis of a mixture of such hydrocarbons which has proved successful is as follows:

*Distillate*

| | |
|---|---|
| Gravity, °API at 60° F. | 23 |
| Flash point Pensky-Marten closed cup, °F. | 180 |
| Viscosity Saybolt seconds Universal at 100° F. | 60 |

*Asphalt*

| | |
|---|---|
| Gravity, °API at 60° F. | 10.2 |
| Flash point Pensky-Marten closed cup, °F. | 430 |
| Viscosity Saybolt seconds Furol at 210° F. | 145 |

To produce a mixture of crude dust and hydrocarbons, safe for shipment and suitable for compounding incendiary fuels, the shock chilled dust is conveyed in a closed atmosphere under natural gas to pug mill type extrusion presses where it is thoroughly mixed with the desired hydrocarbons and extruded through a die plate into open drums. The limitations on this equipment are such that practical concentrations can be made between 55% and 70% solids, the balance hydrocarbons. For reasons of safety it is undesirable to include low flash hydrocarbons at this stage. Various mixtures of fuel oils, or asphalt cut-back with fuel oils, or kerosenes in a considerable range, are practical from a production standpoint. This magnesium material when thoroughly weted with hydrocarbons is not easily ignited nor will it flash or explode. However, if allowed to air dry or come in contact with water, acid, or perspiration, it will sooner or later ignite when such liquid has cut through the protective layer of hydrocarbon so as to react with the finely divided magnesium.

The construction of well known incendiaries, particularly those of the known "stick" form, involves the use of cast solid magnesium metal which is difficult to ignite except by thermite or a similar igniting charge. Incendiaries and flares of magnesium powder have therefore been made by first producing magnesium in solid metal form and then subdividing it. By my method the raw powder coming from the shock chilling step of the carbothermic process may be directly substituted for the far more expensive method at present utilized. Also, the magnesium metal as employed in the carbothermic magnesium paste is of a state of subdivision far greater than that which it is practicable to produce by mechanical comminution.

According to my invention the magnesium powder even in the impure form as recovered from the vapor produced by carbothermic reduction, and with or without other materials, may be directly applied to incendiary use without going through the stage of first producing the coalesced or solid metal. A great advantage of using such a finely divided metal is that the desired ignition is readily obtained with any source of ignition, and even from mere contact with such simple media as air and water. Any substance which gives up oxygen freely enough to produce ignition, i. e., rapid combustion, may be used.

The finely divided magnesium produced in the carbothermic process has a particle size of substantially less than one micron, and as heretofore stated is capable of spontaneous combustion with the atmosphere unless wetted down with a material such as hydrocarbon oil. It is obvious that a particle size on the order of that mentioned cannot be achieved on a commercial scale by use of mechanical means. The fine particles, because of their pyrophoric qualities, would present a considerable fire hazard if mechanically produced, and the high cost and complicated equipment necessary to mechanically produce such particles in an inert atmosphere would be impractical. Thus additional advantages of this invention are that it utilizes an incendiary material of finely divided magnesium of a particle size never before attainable on a commercial scale, and yet such finely divided magnesium is capable of rapid and economic production, and can be safely handled.

The carbothermic magnesium paste may be used as is, as paste, or it may consist of compacted or tabletted pellets or briquettes. Magnesium and/or aluminum in the form of solid metal including alloys thereof, either as a part or all of the container, or an admix in the form of borings, turnings, screenings, or pieces of scrap metal, may be used in conjunction with the carbothermic magnesium paste and may partake of the incendiary reaction, after the same is initiated.

It is to be understood that after the carbothermic magnesium paste is once ignited, it will continue to burn by reaction with the oxygen and/or nitrogen of the air, and tends by the heat and flame produced to ignite adjacent combustibles. Water applied to extinguish it is of no use as it reacts readily with the magnesium, accelerating combustion. Such common extinguishers as carbon dioxide actually accelerate the combustion.

Additional reagents which tend to sustain combustion of the magnesium powder, such as ferric oxide, barium oxide and other similar metal oxides, potassium chlorate, sodium nitrate, and other similar metallic salts containing combined oxygen, sulphur, gasoline or carbon, and mixtures thereof, may be added to the carbothermic magnesium paste and after ignition is instituted as by the liquid oxidizing agent, the further combustion may be sustained or aided by such reagents. Where a liquid, such as water, is employed to produce ignition, the resulting gas, such as hydrogen, is combustible and tends to spread the fire.

Similarly, liquids which by deoxidation by the finely divided magnesium produce combustible gases, tend also to spread the fire by producing a flame reaching into adjacent space for oxygen to support its combustion.

While plain water is the simplest liquid oxidizing agent, there may be situations or conditions or use calling for the addition of antifreeze agents or of liquids which will withstand low temperatures without solidification. Thus alcohols, such as methanol, aldehydes and organic acids may be employed. Also inorganic compounds such as chlorates, permanganates, particularly of the alkali metals, may be dissolved in the liquid or associated therewith. Wetting agents to accelerate the wetting of the incendiary material with the liquid may be used.

It is sometimes also advantageous to aid thereto an agent which will cause heat and/or gas generation, such as quicklime and/or carbides. The addition of carbides to the finely divided magnesium powder is particularly advantageous due to their gas generating properties, because the pressure generated causes the casing containing the incendiary material to burst more rapidly with consequent dispersion of the incendiary charge over the adjacent area in a very effective manner.

An additional feature of the invention is that the finely divided magnesium dust is colloidal in nature and can be readily incorporated to form a fortified hydrocarbon gel type incendiary with good results in sharp contrast to mechanically comminuted magnesium which does not give good results. In the use of carbothermic magnesium paste with the gels or alone there is an additional advantage that the reaction between the colloidal magnesium particles and the oxidizing liquid takes place progressively throughout the mass to liberate great quantities of heat to destructively distill the hydrocarbons in admixture therewith and give off large quantities of inflammable gases with sufficient violence to induce air circulation and mixing to thereby burn the gases substantially to completion. It is to be noted that the use of heavy hydrocarbons is advantageous in that they have a higher heat of combustion on a volume basis than light hydrocarbons, which is important in many instances, e. g. the storage capacity of an airplane. Furthermore, generation of gases with the asphaltic mass of the incendiary yields a swelling ash which is useful, providing access of air throughout the mass and facilitating combustion throughout the residue.

The present invention is a continuation-in-part of my application Serial No. 492,989, filed July 1, 1943, and of my application Serial No. 555,768, filed September 25, 1944 and now abandoned.

The primary object of the present invention is to provide an incendiary composition comprising magnesium and an additive having stickiness or binding characteristics.

Another object is to provide an incendiary composition comprising the magnesium dust formed in the thermal reduction of magnesia by carbon and a binder such as extracted petroleum residue, asphalt, resin, pitch or the like.

A further object is to provide an incendiary mix suitable for bombs of the bursting type wherein a binder material is present in a sufficient amount by weight that burning masses of material of significant size are dispersed upon bursting of the bomb.

According to the present invention, the carbothermic magnesium dust is mixed with a sticky binder such as a hydrocarbon component which contains from 10% to 45% of asphalt and from 55% to 90% of liquid hydrocarbon. The carbothermic magnesium dust contains from 30% to 65% by weight of magnesium metal dust, or dispersoid, and from 35% to 70% by weight of MgO, carbon and other impurities. The dust and the hydrocarbon are mixed together to give a product containing from 55% to 70% solids. The higher amounts of asphalt, for instance, 40% to 45% thereof, are preferred for making up mixtures to be loaded into shells or into aerial bombs, which can be exploded, for example, by high explosive bursters. When the lower amounts of asphalt are employed it is advantageous in many cases to distil a part of the liquid hydrocarbon from the mixture. Oxidizing agents and/or other materials, as described above, can also be added. Other stickiness agents, which may be termed "gelling agents," such as rubber latex, polymerizable or vulcanizable compounds suitable for making synthetic rubbers, including butadiene-styrene copolymer, isoprene and the like, isobutylmethacrylate, aluminum salts of naphthenic acid, all of which are soluble in liquid hydrocarbon, are also useful in small amounts in addition to or instead of, the asphalt.

It is preferred to employ stickiness binders of a hydrocarbon or carbonaceous nature to provide an incendiary of a higher heat capacity and more effective from the standpoint of creating incendiary conditions.

The addition of asphalt has several advantages. It oils the dust particles and protects them from the action of air or moisture. It imparts stickiness so that masses of incendiary material thrown out by a bursting bomb tend to adhere to the surface against which they strike. Asphalt gives higher heat capacity per unit volume and favorably affects the flame characteristics. The first flame is a long flame due to hydrogen or the lighter hydrocarbons remaining in a solvent-treated mixture. Then the length of the flame diminishes somewhat although as the temperature increases, the asphalt undergoes some destructive distillation and continues to provide lighter hydrocarbon fractions which burn in air. The final flames are the white, short, intensely hot flames provided by the burning magnesium, followed then by the continued glowing of the residual mass as the carbon residues are consumed.

Heat of conduction is mainly provided at first but the heat of radiation is very great during the burning of the magnesium. This incendiary will burn through a floor, sometimes by combustion of the flooring material even before the magnesium is exhausted. This is the only incendiary known to produce a self-sustaining fire.

Further advantages of the use of asphalt are that it imparts a swelling characteristic and it improves burning when used with the gelling agents which are known. The use of the proper asphalt and in high enough proportions gives a swelling ash which permits penetration of combustion supporting gases and evolution of gases from within thereby insuring the burning to completion of all ingredients.

In an example of preparing an incendiary composition containing asphalts, about 10 parts by weight of asphalt are dissolved in about 90 parts by weight of a liquid hydrocarbon, such as Stoddard solvent. The dust or paste is admixed with this solution in such amounts as to produce a mixture having about 65% to 70% solids content. The solvent is then distilled off from the mixture to give a final mixture having about 90% to 95% solids content. The resulting product is particularly adaptable for use as a load or charge in incendiary bombs, and the like. The proportions of asphalt may vary depending upon results desired.

As a further example, an incendiary composition suitable for loading into shells or bombs is made up by admixing carbothermic dust, containing about 45% to 50% of magnesium metal, and a hydrocarbon which is a solution of 40% of asphalt in 60% of kerosene, to obtain a mixture containing about 65% to 70% solids. To the mixture is added 7% by weight of sodium nitrate ground in hydrocarbon oil. In testing this composition it is found to be scattered in burning clumps of effective sizes, when set off by a burster charge, and that the clumps adhere well to the target and burn violently.

In another example, effective incendiary loads for bombs for aerial use are prepared by admixing carbothermic dust containing about 45% to 50% by weight of magnesium metal dust, and a hydrocarbon containing 45% of asphalt and 55% of kerosene or gas oil, the mixture containing 65% to 70% of solids. This composition also disperses, upon firing, in clumps of effective sizes, adheres well to the target and burns fiercely.

The term "asphalt" as used in the description of this invention is intended to include all hydrocarbons, or mixture of hydrocarbons of an amorphous nature, either solid or semi-solid and which are ordinarily produced by oxidation of higher boiling-point mineral oils. It is to be understood that any binder having stickiness characteristics may be employed in the practice of the invention. It is sometimes advantageous to mix with the liquid hydrocarbon-asphalt component a small amount, about 1% to 3%, of a polymerizable substance or gelling agent such as natural rubber latex, isoprene, isobutylmethacrylate, butadiene-styrene copolymer, aluminum salt of naphthenic acid or the like, which is also soluble in the liquid hydrocarbon. The sticky mix can also comprise a mixture of the carbothermic dust with liquid hydrocarbon containing about 1% to 2% of a polymerizable substance, such as described above, which is soluble in the hydrocarbon. Suitably the polymerizable substances are those which can polymerize to form gels or synthetic rubbers. They are substances which act in larger amounts to form gels with liquid hydrocarbons, and which when added in amounts of less than about 3% form therewith gels of sticky and adhesive consistency. Mixtures of the stickiness agents can also be employed, for instance, it is frequently advantageous to mix 1% to 2% of a gelling agent, as described, based on the weight of the total mix, with a 90/10 asphalt-liquid hydrocarbon additive.

The main concept of the invention embraces the feature of forming an incendiary composition including a stickiness agent in such quantities that a cohesive mass results.

It is to be understood that the term "incendiary" as used herein is not intended to be limited to incendiaries as applied to bombs or the like, but instead is intended to include any application wherein such material is useful, such as flame throwers, fireworks, flares, signals, etc. In this specification and in the claims, percentages are by weight unless otherwise specified. Aluminum of comparable fineness, that is, obtained by shock-chilling in a manner similar to the production of the carbothermic magnesium dust, can be utilized in incendiary compositions according to this invention also.

The incendiary of the invention is ideal in many applications because it vastly increases the chances of self-sustaining combustion.

I claim:

1. An incendiary composition comprising a mixture of carbothermic magnesium dust, containing from 30% to 65% magnesium metal dust, and a hydrocarbon component containing from 10% to 45% asphalt and from 55% to 90% liquid hydrocarbon, said incendiary composition containing from 55% to 70% of solids.

2. An incendiary composition exhibiting stickiness, comprising a mixture of carbothermic magnesium dust, containing from 30% to 65% of magnesium metal dust, and a hydrocarbon component containing 40% to 45% of asphalt and 55% to 60% of liquid hydrocarbon, said mixture containing from 55% to 70% of solids.

3. An incendiary composition comprising a mixture of carbothermic magnesium dust, containing about 45% to 50% of magnesium metal dust, and a hydrocarbon component containing 45% asphalt and 55% kerosene, said composition containing from 65% to 70% of solids.

4. An incendiary composition comprising a mixture of carbothermic magnesium dust, containing about 45% to 50% magnesium metal dust, and a hydrocarbon component containing 40% asphalt and 60% kerosene, said composition containing from 65% to 70% of solids.

5. An incendiary composition comprising a mixture of carbothermic magnesium dust, containing about 35% to 65% magnesium metal dust, and hydrocarbon component which is a solution of 10% asphalt in liquid hydrocarbon, said composition containing about 65% to 70% solids.

6. A method of preparing an incendiary composition which comprises, preparing a solution of 10% to 40% of asphalt in a liquid hydrocarbon, admixing said asphalt solution with magnesium dust containing 30% to 65% of finely divided magnesium and formed in the thermal reduction of magnesia with carbon to form a mixture containing 55% to 70% of solids, and distilling off a part of said liquid hydrocarbon.

7. A method of preparing an incendiary composition which comprises, preparing a solution of 10% of asphalt in a liquid hydrocarbon, admixing said asphalt solution with the magnesium dust formed in the thermal reduction of magnesia with carbon in quantities sufficient to produce a mixture having about 65%–70% solids, said dust containing 30% to 65% of finely divided magnesium, and thereafter distilling the solvent from the mixture to provide a composition having about 90%–95% solids.

8. An incendiary composition comprising a mixture of carbothermic magnesium dust containing from 30% to 65% magnesium metal dust, and a component containing from 1% to 45% of at least one stickiness agent chosen from the group consisting of asphalt, natural rubber latex, substances polymerizable to form synthetic rubber, isobutylmethacrylate and aluminum salts of naphthenic acid, the remainder of said compenent being liquid hydrocarbon, said incendiary composition containing 55% to 70% of solids.

9. An incendiary composition as in claim 8 wherein said stickiness agent is from 1% to 2% of isoprene.

10. An incendiary composition as in claim 8 wherein said stickiness agent is from 1% to 2% of isobutylmethacrylate.

11. An incendiary composition as in claim 8 wherein said stickiness agent is from 1% to 2% of butadiene-styrene copolymer.

12. An incendiary composition as in claim 8 wherein said stickiness agent is from 1% to 2% of aluminum salt of naphthenic acid.

WILLIAM F. VAN LOENEN.

REFERENCES CITED

The following references are of record in the file of this patent:

FOREIGN PATENTS

| Number | Country | Date |
|---|---|---|
| 126,740 | Great Britain | May 22, 1919 |
| 559,348 | Great Britain | Feb. 15, 1944 |

OTHER REFERENCES

Sabin, "Technology of Paint and Varnish," 2nd edition, published 1917, by John Wiley and Sons, New York, page 166.